J. H. WAGENHORST.
WHEEL.
APPLICATION FILED AUG. 12, 1915. RENEWED SEPT. 27, 1919.
1,369,859. Patented Mar. 1, 1921.
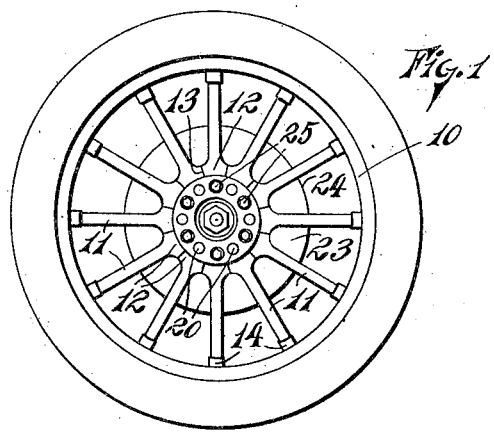
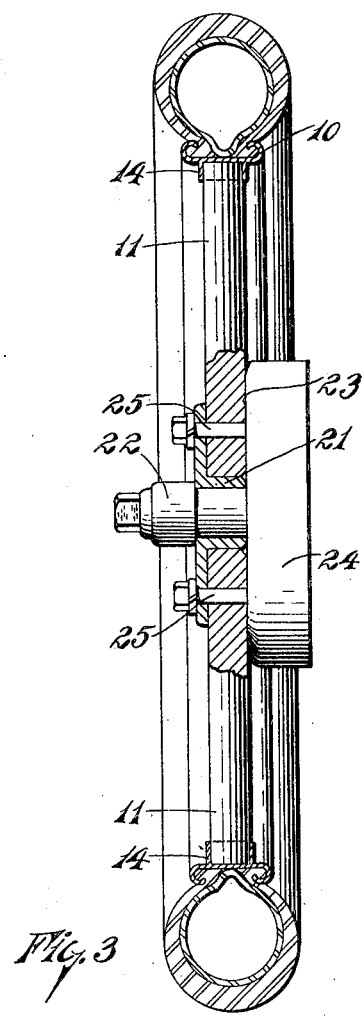
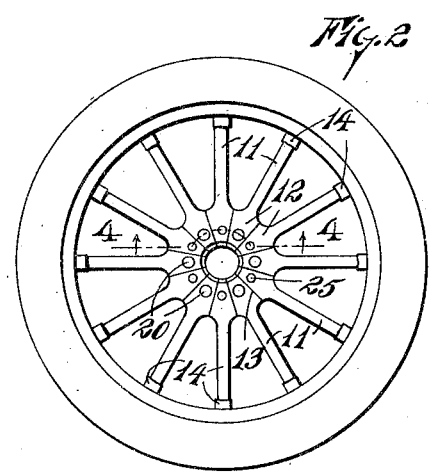
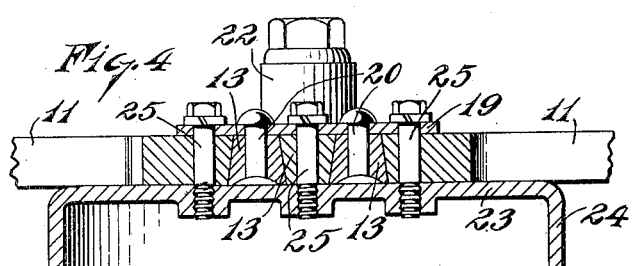
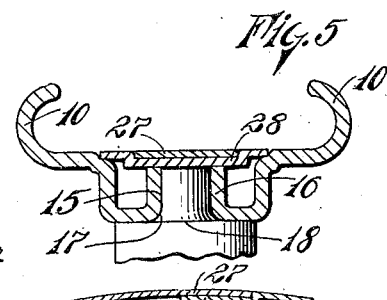
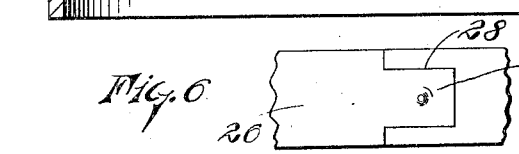

UNITED STATES PATENT OFFICE.

JAMES H. WAGENHORST, OF AKRON, OHIO.

WHEEL.

1,369,859.     Specification of Letters Patent.     Patented Mar. 1, 1921.

Application filed August 12, 1915, Serial No. 45,149. Renewed September 27, 1919. Serial No. 326,925.

*To all whom it may concern:*

Be it known that I, JAMES H. WAGENHORST, a citizen of the United States, residing at Akron, in the county of Summit and State of Ohio, have invented a certain new and useful Improvement in Wheels, of which the following is a full, clear, and exact description, reference being had to the accompanying drawings.

This invention relates generally to wheels and more particularly to a demountable wheel for automobiles and similar vehicles.

The object of the invention is to provide a wheel of this character which can be quickly and easily demounted from the hub, and a wheel of similar construction substituted; and the invention seeks to provide a wheel of this character which can be carried with the same ease as a demountable rim and tire and of such construction that when carried as a demounted wheel, the spokes and rim will be maintained perfectly in their initial positions, and all danger of dislodgement or dislocation entirely avoided.

A further object of the invention is to provide a wheel of exceedingly few parts so constructed and assembled as to effect a considerable saving in time, labor and material in the manufacture thereof.

With these and other objects in view the invention consists in the novel features of construction hereinafter fully described and pointed out in the claims. In the drawings forming part of this specification, Figure 1 is a face view of the wheel embodying my invention; Fig. 2 is a rear view of the same; Fig. 3 is a sectional view of the wheel attached to the hub; Fig. 4 is a sectional view showing bevel of spoke; Fig. 5 shows a modified form of rim, and Figs. 6 and 7 show details of construction.

In carrying out my invention I employ a metallic rim 10, preferably of rolled metal in the form of a continuous unbroken circle and shaped to receive a clencher tire, but the rim could be made to receive a straight sided tire.

The spokes 11 are of wood, and at their inner or hub ends are tapered at 12, and these tapered ends are beveled as indicated at 13, the bevels of each alternate spoke being in reverse directions, so that when the spokes are assembled, the broad side of one tapered end will be upon the outside of wheel while the next adjacent spokes will have their narrow ends outermost and their wide portions upon the inner side of wheel.

The spokes are assembled within the inexpansible metallic rim 10, and pressure is applied to the assembled spokes at their hub portions, the tapered and beveled ends being forced into alinement by hydraulic and other pressure and they become permanently wedged owing to the radial taper and reverse bevels. In wedging these ends together each spoke is given a slight radial movement, thereby forcing the outer ends of the spokes tightly into contact with the metallic rim.

If desired the rim can be provided with caps 14 for receiving the outer ends of the spokes said caps being connected to the rim by spot welding, brazing or riveting.

Instead of the caps, however, the rim can be made with openings 15, to receive the tenons on the ends of the spokes, the metal of the rim being punched or drawn up into the channel portion as shown at 16, and providing suitable reinforcements and bearings around the tenons of the spokes, and in this punching process the shoulder of the opening 15 is curved or rounded at 17 and the tenons of the spokes are each formed with a corresponding fillet 18, thereby providing a perfectly tight joint between the spoke and rim.

In practice I have found that the hub portion of a wheel constructed as herein shown and described is exceedingly strong owing to the close binding contact of the tapered and wedged portions of the spokes, but in order to provide additional safety I arrange a metal plate or disk 19 upon the outside of the wheel, and connect each alternate spoke with said plate or disk by means of a rivet 20, passed through the inner side of the spoke, the head of the rivet being flush with the face of the spoke, and the opposite end of said rivet is headed down on the plate or disk 19, and it will be noted that the spokes through which the rivets pass, are those which have their broad faces upon the inner side thereby making these wedge shaped ends practically integral with the plate or disk upon the outside, and preventing any possible movement of the alternate spoke ends which are held between each pair of riveted spokes and the plate.

The central portion of the plate is turned inwardly providing a sleeve 21 against which the ends of the spokes rest and this sleeve facilitates the placing and removal of the wheel upon the hub proper 22 said hub being inserted from the inner side of the wheel.

The disk 23 of this hub is shown with a brake drum 24 connected thereto but it will be understood that my improved wheel is adapted for use upon any type of hub either with or without a brake drum, and for the purpose of securely connecting my improved demountable wheel to the hub 22, I employ stud bolts 25 which are passed through the front plate and the end of the spokes into the disk of the hub. Any desired number of bolts may be employed. In the present construction I employ six bolts, and these pass through each alternate spoke, and the spokes through which the bolts are passed are those which are devoid of rivets.

In order to demount the wheel from the hub, it is only necessary to remove the stud bolts and lift the wheel from the hub, the hub attaching cap being of course previously removed.

In Fig. 5 I have shown a form of rim in which the spoke openings are provided with integral reinforcing edges, and to protect the rim tube against these portions, I employ a thin band 26, which is placed within the channel of rim and has a reduced end 27 which fits into a recessed portion 28 in the opposite end and these end portions are arranged over a spoke hole and can be spot-welded so as to hold the band to the rim.

A wheel constructed as herein shown and described is quickly and economically manufactured and is of exceeding strength at both the central and rim portions and can therefore be easily carried as an additional demountable wheel and all danger of impairment while being so carried is completely avoided by the inherent coacting strength of the parts from which the wheel is constructed.

Having thus described my invention, what I claim is:—

1. A wheel comprising a felly and a plurality of wooden spokes having their inner ends tapered and beveled, a circular plate upon one side of the wheel body, and rivets passing through each alternate spoke and through said plate as set forth.

2. A wheel comprising a felly and a plurality of wooden spokes, the inner ends of said spokes being tapered and beveled, a central plate upon the exterior of said wheel, rivets passing through each alternate spoke and said plate, a second plate upon the interior of said wheel, and stud bolts passing through each alternate spoke and into said second plate.

In testimony whereof I hereunto affix my signature in the presence of two witnesses.

JAMES H. WAGENHORST.

Witnesses:
CHAS. E BROCK,
ROBERT L. BRUCK.